United States Patent [19]

Yoshida et al.

[11] Patent Number: 5,422,694
[45] Date of Patent: Jun. 6, 1995

[54] DATA RECORDING APPARATUS FOR CAMERA

[75] Inventors: Yutaka Yoshida; Hiroshi Komatsuzaki, both of Tokyo, Japan

[73] Assignee: Fuji Photo Film Co., Ltd., Kanagawa, Japan

[21] Appl. No.: 990,325

[22] Filed: Dec. 14, 1992

[30] Foreign Application Priority Data

Dec. 12, 1991 [JP] Japan .................. 3-329058

[51] Int. Cl.6 .......................... G03B 17/24
[52] U.S. Cl. .................. 354/106; 354/173.1
[58] Field of Search ............ 354/105, 106, 173.1, 354/173.11, 212, 214

[56] References Cited

U.S. PATENT DOCUMENTS

| | | | |
|---|---|---|---|
| 4,864,332 | 9/1989 | Harvey | 354/105 X |
| 5,021,820 | 6/1991 | Robinson et al. | 354/106 X |
| 5,023,656 | 6/1991 | Terashita | 355/41 |
| 5,184,161 | 2/1993 | Egawa | 354/105 |

FOREIGN PATENT DOCUMENTS 60-166937 8/1985 Japan .

Primary Examiner—Howard B. Blankenship
Attorney, Agent, or Firm—Sughrue, Mion, Zinn, Macpeak & Seas

[57] ABSTRACT

A camera for recording photographing data on a photographic film during one frame advancement of the film. During advancement, an encoded disk rotates with a driven roller in contact with the film. A photo-interrupter generates an ENC pulse each time the encode disk rotates through a predetermined angle, and supplies it to a microcomputer. Each time the microcomputer receives an ENC pulse, it measures a pulse period between a previously generated ENC pulse and presently generated ENC pulse. In accordance with the measured pulse period, a predicated pulse period between the presently generated ENC pulse and a next ENC pulse is calculated. N timings are obtained by dividing the predicted pulse period to record N-bits of data on the film during the predicted period by driving a recording head N times.

20 Claims, 8 Drawing Sheets

DATA RECORDING APPARATUS FOR CAMERA

BACKGROUND OF THE INVENTION

1. Field of the Invention

The present invention relates to a data recording apparatus for cameras, and more particularly to a data recording apparatus for optically or magnetically recording various types of data on a photographic film while the film is advanced.

2. Description of the Related Art

It is known to utilize cameras capable of recording photographing data on a photographic film at the time of taking a photograph. The photographing data may relate to shutter speed, aperture value, electronic flash conditions, aspect ratio representing a print format, position of a main subject on a picture frame, or other variables. This photographing data is read from the photographic film during the photofinishing process for controlling the print exposure, setting the print format, and the like. A magnetic data recording method described, for example, in U.S. Pat. No. 4,864,332 and U.S. Pat. No. 5,021,820 and an optical recording method described, for example, in U.S. Pat. No. 5,023,656 are known. Digital recording is advantageous over analog recording in that errors in reading and writing the data can be minimized. When digital recording is used, data is represented by a binary code consisting of a plurality of bits, and the binary code may be written as a combination of magnetic areas and non-magnetic areas, or as a combination of photographically exposed areas and non-exposed areas.

If the film advance speed of the camera is always constant, a binary code representing photographing data can be written on the film loaded in the camera while the film is advanced, with bit lengths being constant, by driving the magnetic recording head or light recording head in accordance with the constant film advance speed. However, it is very difficult to maintain a constant film advance speed over the full length of a film roll, because the diameter of the film wound on the film take-up spool increases as the film is advanced frame by frame. Therefore, in order to record each bit of the binary code in a predetermined fixed length of film, it is necessary to drive the recording head in accordance with the precisely detected film advance speed.

Conventionally, the film advance amount is measured by an encoder constructed of an encoded disk and a photo-detector. The encoded disk has a plurality of slits formed therein at a fine pitch so as to extend in the radial direction. The encoded disk is coupled to the camera advance mechanism and rotates synchronously with the film advance. The photo-detector detects a passage of each slit. A film advance speed is detected from the number of slits which pass per unit time, and a film winding amount is detected from the total number of slits which have passed. Using these detected values, the recording head is controlled and driven.

As the amount of data written within a length of one frame increases, the bit record length (unit bit length) of each bit constituting a binary code must be shortened. Under such a condition, it is very difficult to write a binary code correctly and avoid the generation of read errors if the recording head is driven in the manner described above. To solve this problem, it is necessary to more accurately measure a film advance speed and winding amount through the use of an encoded disk having a finer pitch of slits. This requires a high precision in machining of the encoded disk, and a high resolution photo-detector. Such a construction is expensive, resulting in a high cost of manufacturing of the camera.

SUMMARY OF THE INVENTION

It is a principal object of the present invention to provide a data recording apparatus for a camera capable of maintaining a constant record length of each data bit even if the film advance speed fluctuates.

It is another object of the present invention to provide a data recording apparatus for a camera capable of maintaining a constant record length of each bit by using a low cost encoder having a simple structure.

The above and other objects of the present invention can be achieved by determining the data recording timings by predicting the time when the next encoded pulse is generated.

In the present invention, an encoded pulse generating device generates a pulse each time a photographic film loaded in a camera is advanced by a predetermined length. A measuring device measures a pulse period between previous and current pulses when the current pulse is generated. A calculating device calculates, from this measured result, a predicted pulse period between the current pulse and next pulse, and determines the data recording timings. In response to the data recording timings, a recording device is driven to record the data on the film until the next encode pulse is generated. In recording N bits during the encoded pulse period, the recording timing for each bit is determined from a time duration obtained by dividing the predicted pulse period by N.

According to a preferred embodiment, the encoded pulse generating device generates a plurality of pulses synchronously during advancement of the film through one frame. The pulse period is measured to obtain an allowable range of a pulse period. The allowable range may be determined by a preset variance, the upper and lower limits of pulse periods, or through other methods. When the pulse period between the previously generated pulse and presently generated pulse enters this range, the recording is driven to record data. If the film is advanced without causing the pulse period to enter the predetermined range, and the film advance amount left within the length of one frame is not long enough for recording the data, the film is rewound to the initial position before the frame advance, and thereafter it is again advanced while the data is recorded.

According to the present invention, by using the period between previously measured pulses, the generation timing of the next pulse is predicted. In accordance with the predicted data, the data recording timings are determined. As a result, even if data of a plurality of bits is recorded in a shorter period than the pulse period, it is possible to maintain the record length of each bit, so that read errors by a photographic printer or the like can be minimized. It is possible to record N bits during one pulse period by using bit recording timings obtained by dividing the pulse period between the current and predicted next pulse by N. Since the film advance speed can be monitored from the pulse period, it is possible to start data recording after the film advance speed becomes constant. If the data recording is difficult because of an unstable film advance speed, the film is rewound and the data is recorded again. Therefore, a film advance function without a corresponding data recording function can be prevented.

BRIEF DESCRIPTION OF THE DRAWINGS

The above and other objects and advantages of the present invention will become apparent from the detailed description of the preferred embodiments when read in conjunction with the accompanying drawings, in which.

DETAILED DESCRIPTION OF THE PREFERRED EMBODIMENTS

Figure 1:
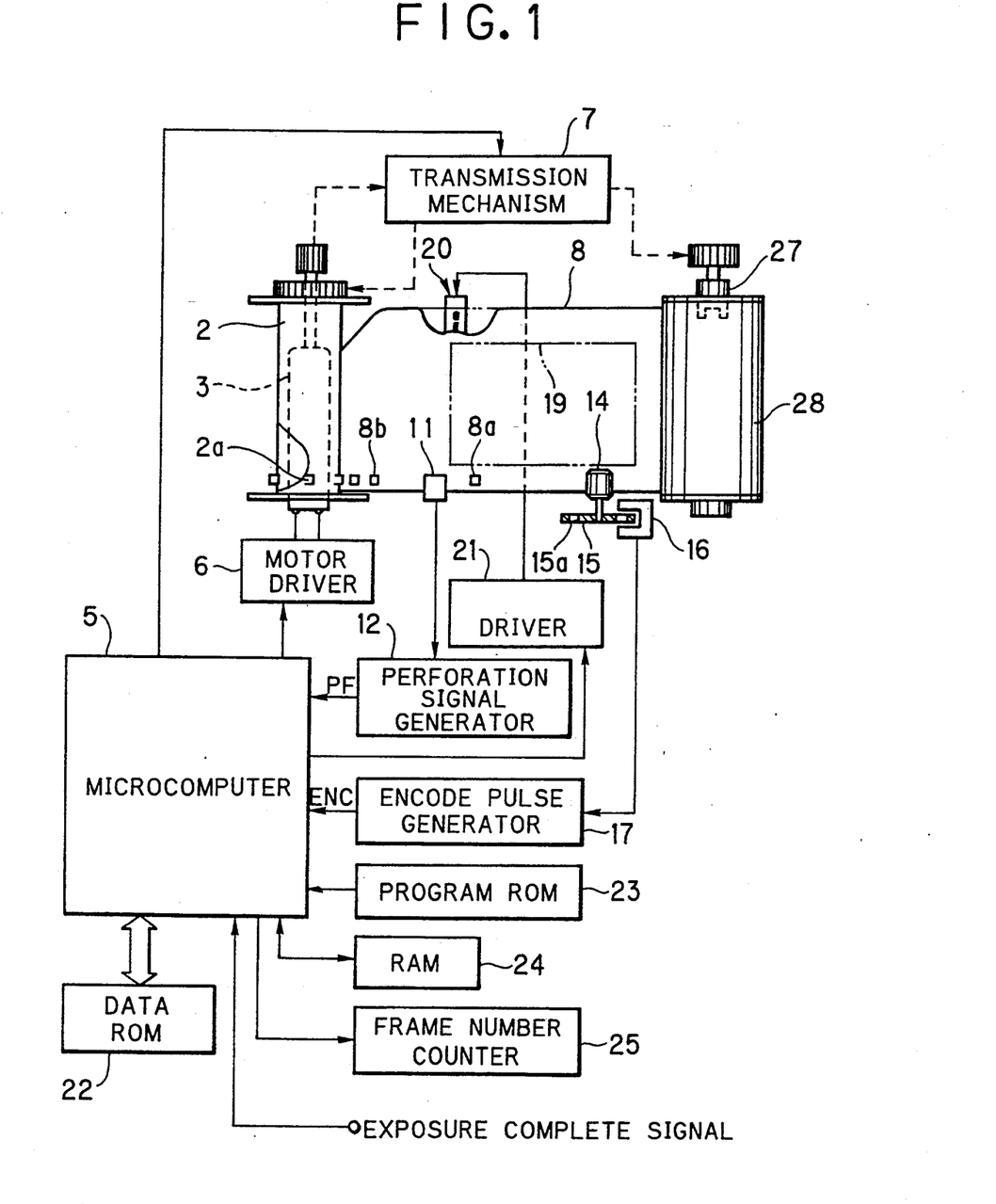
FIG. 1 is a schematic diagram illustrating a camera using a data recording apparatus according to the present invention.

Referring to FIG. 1, a film take-up motor 3 is disposed inside a take-up spool 2. The motor 3 is driven by a motor driver 6 in response to a command from a microcomputer 5. When the back door of the camera is closed after a film cassette 28 is loaded therein, the microcomputer 5 causes the motor 3 to rotate. Rotation of the motor 3 is transmitted to the take-up spool 2 via a transmission mechanism 7. A portion of the photographic film 8 pulled out from the film cassette 28 is wound on the outer circumference of the take-up spool 2, to set the first frame in opposition to an exposure opening 19. After the first frame is exposed in response to actuation of a shutter, the motor 3 is again driven in response to a signal from the microcomputer 5, so that the film 8 is advanced by one frame to set the second frame at the back of the exposure opening 19.

The film 8 of this embodiment has one perforation 8a formed therein per each frame. Three or four perforations 8b are formed in the leader portion of the film 8 with a short interval therebetween. These perforations 8b are captured by claws 2a of the take-up spool 2. A reflection or transmission type photo sensor 11 for detecting a passage of each perforation 8a is mounted in the film passage of the camera. When the film is wound, the light projector of the photo sensor 11 emits an electromagnetic wave having a wavelength which does not expose the film, e.g., an infrared wave. When the light receiver of the photo sensor 11 detects the perforation 8a, a perforation signal generator 12 supplies a perforation (PF) pulse to the microcomputer 5 which in turn sends a stop signal to the motor driver 6 to quickly stop the motor 3.

A 135 type photographic film which is commercially available has eight perforations per frame formed at a constant pitch. For such a film, the number of PF pulses is counted and film winding is stopped when eight pulses are counted. When the film cassette 28 is loaded in the camera, the leader portion advances toward the take-up spool 2. During this advancement, it is possible to evaluate the quality of the film loading procedure by checking whether or not intermittent PF pulses are generated.

A driven roller 14 is in contact with the film 8, and rotates along with the advancement of the film 8 without any slip. An encoded disk 15 is coupled to the driven roller 14, and rotates integrally with the driven roller 14. A plurality of radial slits 15a are formed in the encoded disk 15 at a constant pitch. Each time the photo-interrupter 16 detects the passage of a slit 15a of the encoded disk 15 as it rotates, an encode pulse generator 17 generates an encode (ENC) pulse which is input into the microcomputer 5. As described above, since the driven roller 14 rotates with the advance of the film 8, an ENC pulse is generated each time the film 8 is advanced by a predetermined amount.

Figure 2:
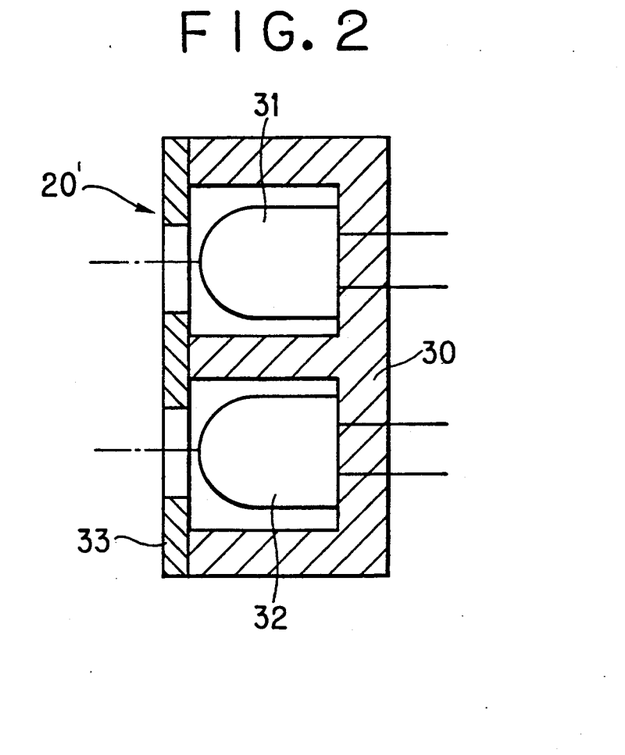
FIG. 2 is a cross sectional view of a light recording head.
Figure 3:
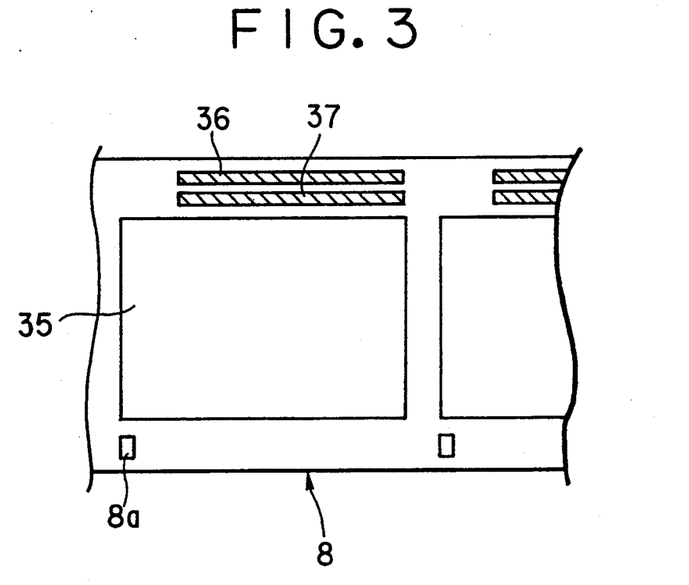
FIG. 3 is a plan view of a photographic film having a recording area for photographic data.

A recording head 20 is mounted just outside of the camera exposure opening 19. As shown in FIG. 2, the recording head 20 can be a light recording head 20' which is constructed of a housing 30, two LEDs 31 and 32 mounted within the housing 30, and a mask plate 33. Alternatively, recording head 20 can be a magnetic head and other portions of the camera and film can be suited for magnetic reading and writing of data. Two slits are formed in the mask plate 33 to shape light emanating from LEDs 31 and 32 into a laterally elongated form. The recording head 20 is driven by an appropriate driver 21 as the film is wound onto take-up spool 2, and as shown in FIG. 3, records photographing data in two hatched stripe areas 37 which are above each frame. As described above, the photographing data includes exposure control data (shutter speed, aperture value, and the like) and print instruction data (aspect ratio, main subject position, type of illumination light source, and the like). In this embodiment, a data ROM 22 storing binary coded exposure control data is accessible by the microcomputer 5 for writing exposure control data.

A program ROM 23 stores sequence programs for controlling the above-described various sequences and the data write operation which is described below. A RAM 24 is used as a work area for temporarily storing programs and flags necessary for executing a photographing sequence and a data write operation. A frame counter 25 counts the number of exposed frames of the film 8. Both LEDs 31 and 32 are used in the preferred embodiment. However, a single LED may be used depending upon the amount of data to be written. Also, a magnetic data recording device may be utilized.

Similar to the leading portion of the film 8, the trailer portion also has three or four perforations formed therein with a short interval therebetween. When the film 8 begins to be wound up after the final frame was exposed, the number of ENC pulses is counted to measure a film advance amount. If perforations are successively detected by the photo sensor 11 before the film is advanced an amount corresponding to one frame length, the transmission mechanism 7 switches to a film rewinding state in response to a command from the microcomputer 5. In such a state, a drive shaft 27 is rotated by virtue of motor 3 and transmission mechanism 7 in the rewinding direction to rewind the exposed film 8 into the cassette 28. A completion of the rewinding operation is detected in response to a signal from the photo sensor 11 (e.g., pulses corresponding to the leader perforations or a constant signal corresponding to the absence of film), and the motor 3 is stopped upon this detection. A clutch mechanism, which is coupled to microcomputer 5, may be provided in the transmission mechanism to selectively switch between the winding and rewinding states by changing the rotation direction of the motor 3.

Figure 4:
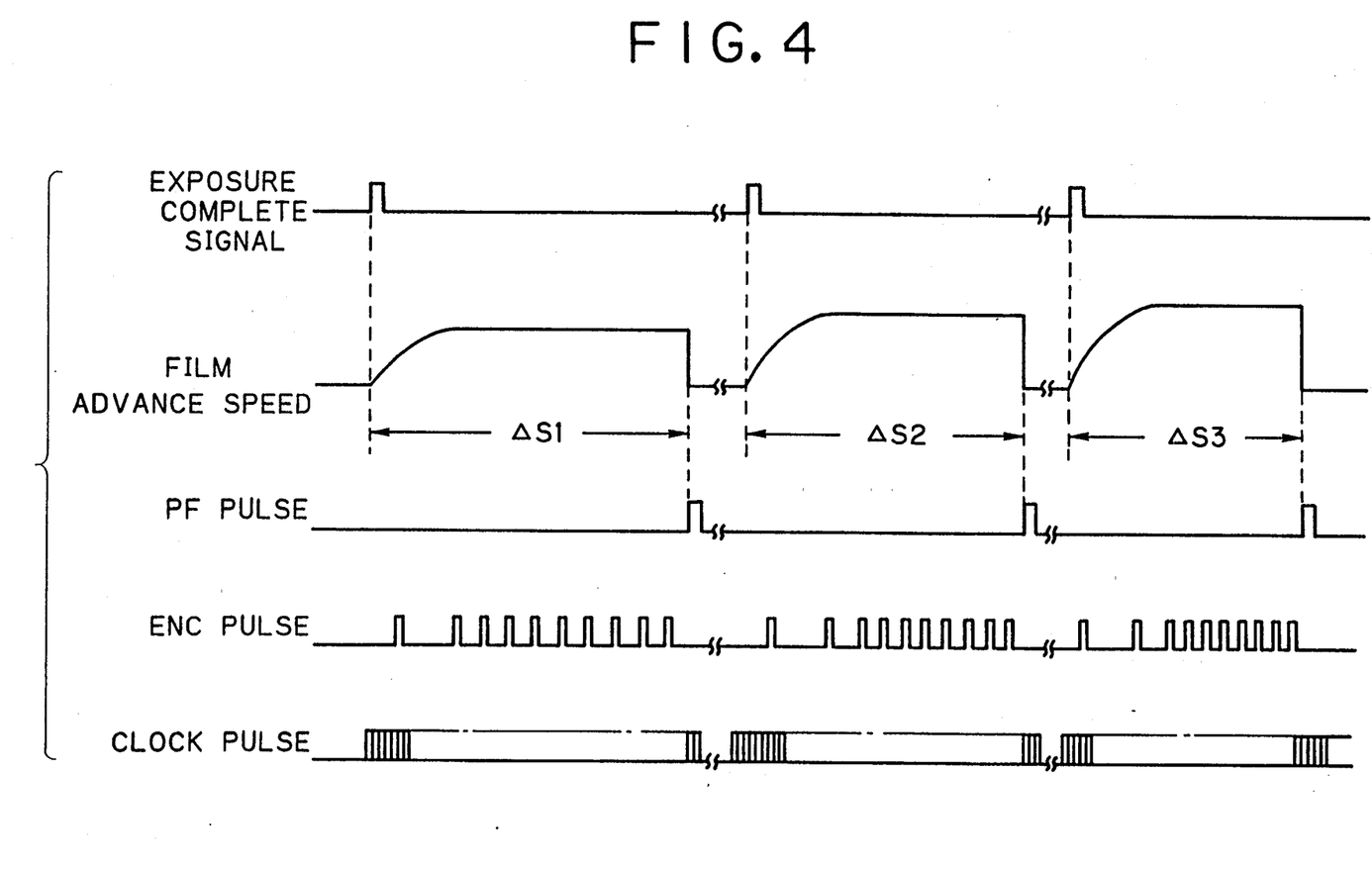
FIG. 4 is a timing chart for film advance next.

A data write function of the camera having the above described structure will be described below. FIG. 4 shows an example of the timings of PF and ENC pulses generated when the film 8 is advanced by one frame. When an exposure completion signal is supplied from the shutter device to the microcomputer 5, the motor 3 starts rotating to wind the film 8. When a PF pulse is detected during the winding operation, the motor 3 is stopped. During advancement of the film 8, each time the film 8 is advanced by a preset distance, one ENC pulse is generated. Consider now the case where ten ENC pulses are generated during a one frame advancement. If data consisting of ten bits is to be recorded during the one frame advancement, each data bit is optically recorded by actuating the LEDs 31 and 32 in accordance with the timing of each ENC pulse generation. Namely, a period between two consecutive ENC pulses is predicted, and during this predicted period, the LED's 31 and 32 are driven appropriately. In this manner, each bit can be recorded at the correct position while maintaining a constant bit record length.

However, if the data to be recorded during one frame advance consists of more than 10 bits, particularly if several bits are to be recorded during a period between two ENC pulses, it is not possible to use the ENC pulse timing as the data write timing and determine the bit record length while predicting the period between two consecutive ENC pulses. In such a case, it is conceivable to obtain timings based on clock pulses from the microcomputer 5. However, as shown in FIG. 4, since the film roll diameter at the take-up spool 2 increases as each frame is exposed, the advance speed of the film 8 also increases. The time $\Delta S$ required for winding the film by one frame is not constant for all frames, but is reduced so that:

$$\Delta S1 > \Delta S2 > \Delta S3$$

(wherein $\Delta S1$ is the time required for advancing the first frame, $\Delta S2$ is the time for the second frame etc..).

It is therefore very difficult to determine the drive timing of the light recording head 20 in accordance with the number of clock pulses counted from the time when, for example, the exposure completion signal is generated.

Figure 5:
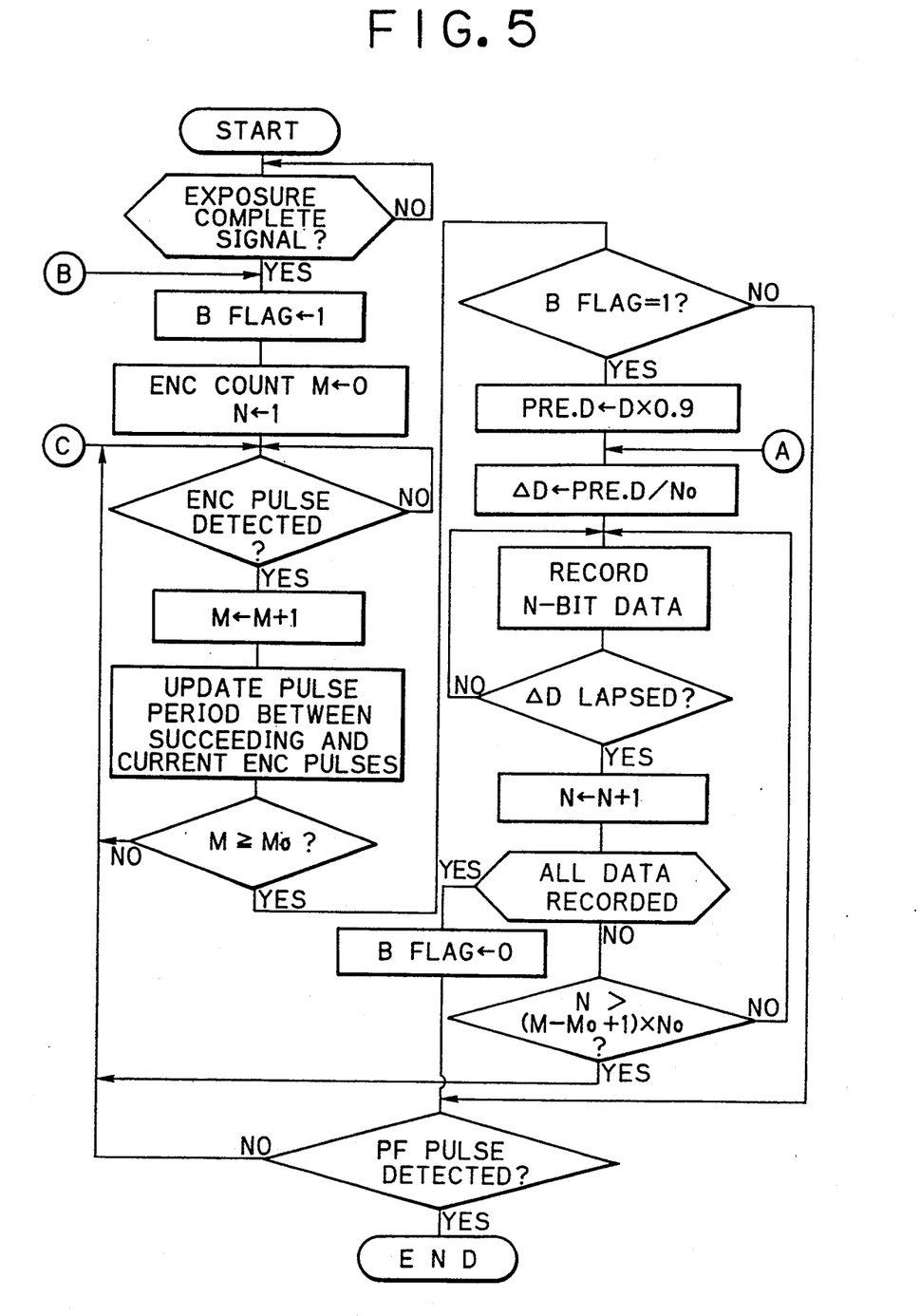
FIG. 5 is a flow chart illustrating the process of data writing.

According to the present invention, timing pulses for driving the light recording head 20 are basically determined from the counts of ENC pulses and clock pulses, as illustrated in the timing chart of FIG. 4 and the flow chart of FIG. 5. When the exposure completion signal is supplied to the microcomputer 5, a B flag representing an enable state of data recording is set to 1, a counter for counting the number of ENC pulses is initialized to 0 (ENC count M →0), and a data recording bit position is initialized to 1 (bit position N→1).

Each time the film 8 is advanced by a predetermined length, an ENC pulse is generated. The number of ENC pulses is accumulated as an ENC count M. Data recording is not effected until the number of ENC pulses reaches MO (in this embodiment, MO=4) because the pulse period is not constant during the initial film winding period during which the rotation of the motor 3 is unstable. Of course, the actual value of Mo will vary depending on the specific structure of the camera.

However, this value can be easily determined by preliminarily counting the number of ENC pulses before advancement speed becomes constant. Each time an ENC pulse is detected, the pulse period D between the detected ENC pulse and the previous ENC pulse is measured, and the new pulse period replaces the previous pulse period. As the number of ENC pulses increases, the pulse period D generally becomes shorter. The motor 3 of the preferred embodiments has been found to run substantially at a constant speed when the ENC count M reaches 4.

When the ENC count M reaches 4, the microcomputer 5 calculates a predicted pulse period PRE.D between the presently detected ENC pulse and the next ENC pulse to be detected. This prediction calculation is carried out by multiplying 0.9 by the pulse period D between the previously detected (third) ENC pulse and the presently detected (fourth) ENC pulse. The multiplication by 0.9 is determined on the assumption that the rotation speed of the motor 3 increases to the steady state of constant speed rotation, and that the film advance speed increases as the film wound diameter at the take-up spool 2 increases. If these affects are negligibly small, the previous pulse period D may be used as the current predicted pulse period PRE.D. Also, any other appropriate algorithm may be used to calculate PRE.D.

The predicted pulse period PRE.D is divided by the number of bits (in this embodiment, NO=5) to be recorded during the predicted pulse period, to obtain a unit bit record time $\Delta D$. If 10 bits are to be recorded during one ENC pulse period, the predicted pulse period PRE.D is divided by 10, to obtain the unit bit record time $\Delta D$, i.e., the time during which the LED's 31 and 32 are driven. The remainder of the division may be rounded down, rounded up, or handled as desired. The number of clock pulses corresponding to the predicted pulse period PRE.D is significantly larger than the number of bits to be recorded, because the frequency of clock pulses is high, generally in the order of several MHz. Therefore, the remainder of the division for these clock pulses can be neglected when $\Delta D$ is divided by the period of the clock pulses in order to obtain the proper data recording timing with respect to the clock pulses.

Figure 6:
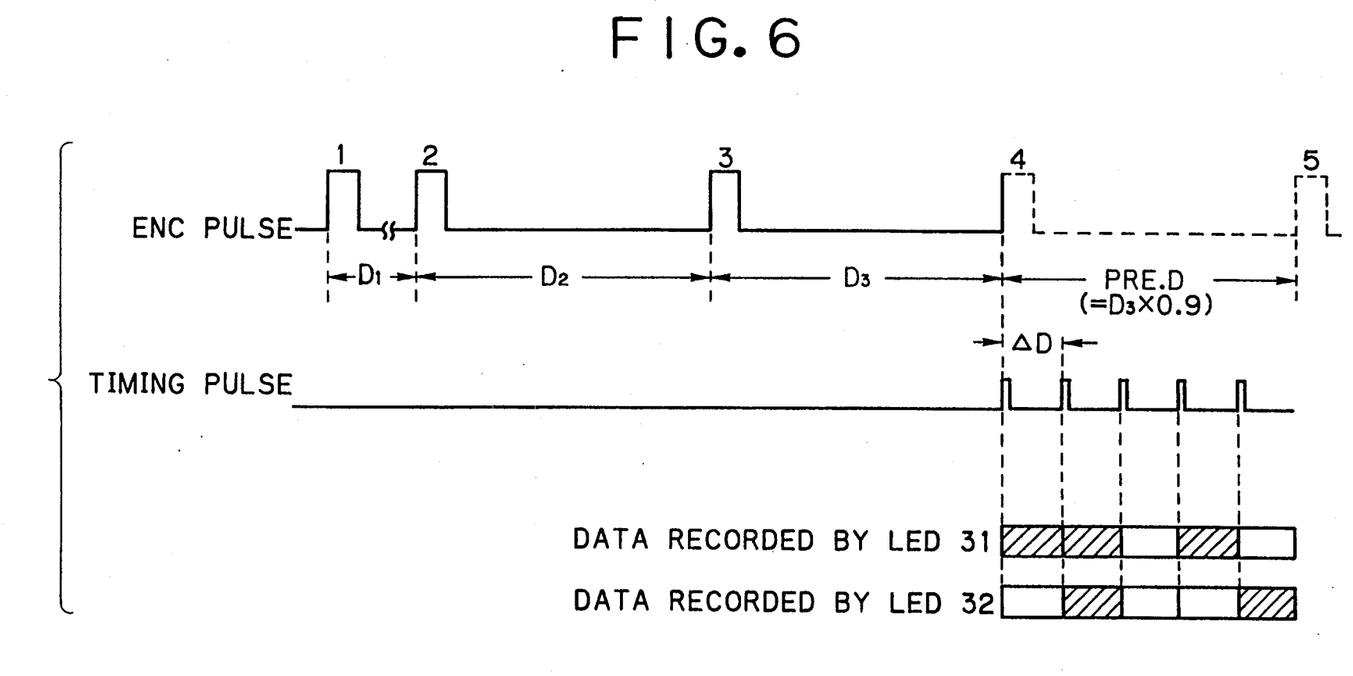
FIG. 6 is a timing chart illustrating a relationship between ENC pulses and data write timing pulses.

With the unit bit record time $\Delta D$ thus obtained, data recording starts from the start bit and is performed sequentially at following bit positions each time the unit bit record time $\Delta D$ lapses based on the clock pulses. For example, as shown in FIG. 6, during an ENC pulse period, data 11010 is recorded by LED 31 and data 01001 is recorded by LED 32. The microcomputer 5 reads data from the data ROM 22 and supplies each binary data bit to the LED driver 21 each time the unit bit record time $\Delta D$ lapses. The LED driver 21 turns on LED 31 for the binary data bit 1, and turns off LED 32 for the binary data bit 0. In this manner, LEDs 31 and 32 are appropriately driven during the unit bit time $\Delta D$ in accordance with their corresponding binary data patterns stored in ROM 22, to record the data patterns as latent photographic images as shown in FIG. 6 in the areas 36 and 37 on the film 8 (see FIG. 3).

After the five bits of data have been recorded during the predicted pulse period PRE.D, a check is conducted to determine whether data is to be further recorded. For example, if 16 bits of data are to be recorded during one frame advance, after the generation of the fifth ENC pulse, similar operations are performed for the data write of the sixth to tenth bits. The predicted pulse period PRE.D and unit bit record time ΔD for this case are obtained based upon the detected pulse period D between the fourth and fifth ENC pulses. Similarly, for the data of the eleventh to fifteenth bits, the detected pulse period D between the fifth and sixth ENC pulses is used to estimate a PRE.D. Immediately after the detection of the seventh ENC pulse, the data of the sixteenth bit is recorded during the first unit bit record time ΔD. After all the data corresponding to one frame is recorded, the B flag is reset to 0. Thereafter, although counting of ENC pulses continues, the data recording is not effected while the film is wound. When the PF pulse is detected while winding the film, the motor 3 is stopped to complete the winding of one frame. The number of ENC pulses generated during one frame winding is accumulatively counted irrespective of whether data is recorded or not. In the preferred embodiment, 10 slits in the encoded disk 15 correspond to one frame on the film 8 and thus the count reaches a constant value 10 irrespective of the film advance speed and film roll diameter at the take-up spool 2. Therefore, the ENC pulse count may be used for the film advance control. For example, when the tenth ENC pulse is detected, the motor 3 is decelerated, and thereafter upon detection of the PF pulse, the motor 3 can be instantly stopped.

The similar operations are repeated each time the exposure completion signal is inputted to the microcomputer 5, to thereby record various data corresponding to each of the frames in the form of latent photographic images. In the above embodiment, the film advance amount is determined based on the number of generated ENC pulses and the film advance speed is monitored from each pulse period between two ENC pulses. Using this film advance information, the timing for data recording is obtained. It is therefore possible to record data even if the data has a number of bits which is far greater than the number of ENC pulses generated during advancement of one frame, irrespective of the characteristics of the motor and the film roll diameter at the take-up spool 2. If a film having a plurality of perforations per frame is used, passages of perforations photoelectrically or mechanically detected can be used in place of the ENC pulses.

In the above embodiment, ten ENC pulses are generated during one frame advance for simplicity of description. However, more ENC pulses can be generated during one frame advance, without using expensive parts for the encoded disk 15 and photo-interrupter 16. Also, in place of the prediction calculation "PRE.D=D×0.9" shown in the flow chart of FIG. 5, the following operation can be performed to calculate the predicted pulse period PRE.D more precisely, by a construction which generates several tens of ENC pulses during advancement of one frame.

In the first embodiment, the predicted pulse period PRE.D is calculated based upon only the most recently detected pulse period D3 for example. However, in a second embodiment, a plurality of pulse periods D detected previously are used for calculating the predicted pulse period PRE.D more precisely. In this case, the plurality of pulse periods D detected previously are weighted by weighting coefficients so as to lessen the influence of the earlier pulse periods to the predicted pulse period PRE.D, because it is assumed that, the older the detected pulse periods, the less the influence thereof on the future pulse period. To this end, the weighting coefficients $K_i$ satisfying the following expressions (1) and (2) are utilized, where i is a positive integer, and M is the number of ENC pulses generated previously:

$$K_i \geq K_{i-1} \tag{1}$$

$$\sum_{i=0}^{i \leq M} K_i = 1 \tag{2}$$

The predicted pulse period PRE.D can be calculated by the following expression (3), where $D_i$ is an i-th pulse period between ENC pulses, and $D_{M-1}$ is the latest pulse period. As the weighting coefficients $K_i$, a geometrical series given by the expression (4) may be used.

$$PRE.D = \sum_{i=0}^{i \leq M} (K_i \cdot D_i) \tag{3}$$

$$K_i = Q^{M-i} / \sum_{i=0}^{i \leq M} Q^{M-i} \tag{4}$$

If Q=0.5 and M approaches infinity, the denominator of the expression (4) becomes "1" and so $K_i = Q^{M-i}$. Therefore, the predicted pulse period PRE.D is given by the following expression (5). Using f=M−1, the expression (5) is rewritten to the expression (6).

$$PRE.D = \sum_{i=0}^{i \leq M} (Q^{M-1} \cdot D_i) = $$

$$Q \cdot \left\{ D_{M-1} + \sum_{i=0}^{i < M-1} (Q^{M-i-1} \cdot D_i) \right\} \tag{5}$$

$$PRE.D = Q \cdot \left\{ D_{M-1} + \sum_{i=0}^{i \leq f} (Q^{f-i} \cdot D_i) \right\} \tag{6}$$

The expression (6) indicates that a new predicted pulse period PRE.D can be calculated by multiplying a factor Q (=0.5) by a sum of the present pulse period D and the previous predicted pulse period PRE.D. Namely, in obtaining a new predicted pulse period PRE.D from a plurality of pulse periods D previously measured, the previous predicted pulse period PRE.D can be used. With this calculation, it is not necessary to calculate a product sum of a plurality of past pulse periods, and thus it is possible to calculate the predicted pulse period PRE.D in a short time. This is very advantageous in a real time control system as in the case of the present invention.

The predicted pulse period PRE.D obtained in this manner may be multiplied by 0.9 for the same reasons as described above with respect to the first embodiment, to obtain the final predicted pulse period. Note that the value M does not actually approach infinity. However, the denominator of the expression (4) can be assumed to be substantially equal to 1, assuming that the number of ENC pulses to be detected during one frame of advancement is relatively high and the above calculation is performed after M>32, for MO−33 in the flow chart of FIG. 5 after the initial advance period.

Figure 7:
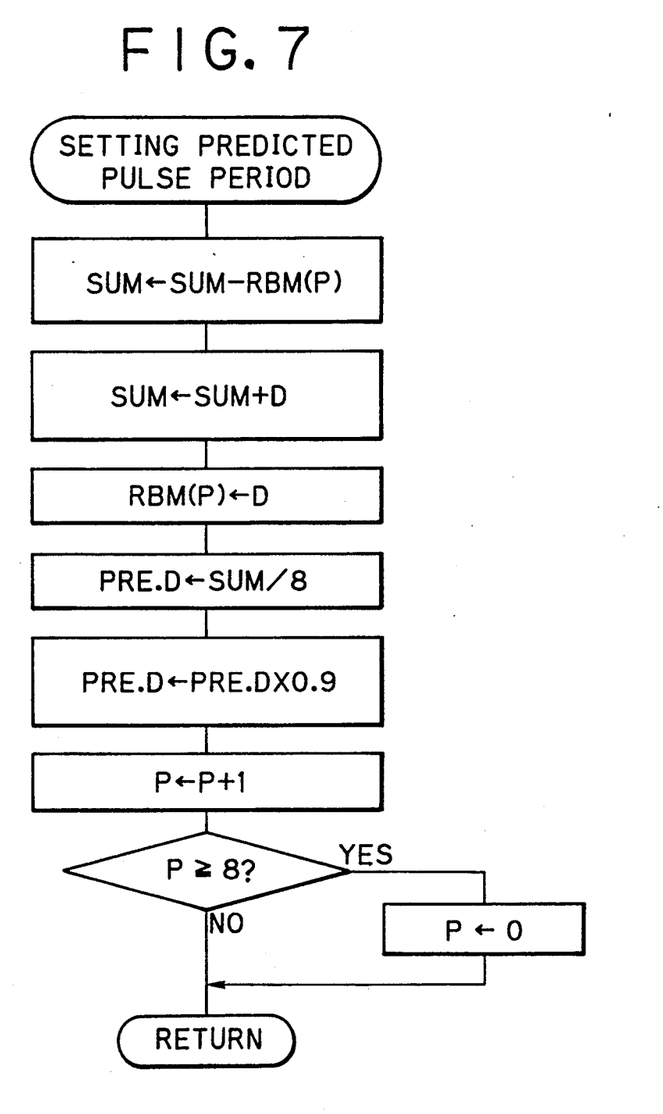
FIG. 7 is a flow chart illustrating the process of obtaining a predicted pulse period according to a third embodiment.

Instead of the calculation using the weighting coefficients, an average value of a plurality of pulse periods D obtained in the past can be used for obtaining the predicted pulse period PRE.D. FIG. 7 illustrates the calculation of obtaining the predicted pulse period PRE.D by using an average value of eight pulse periods D measured in the past according to a third embodiment. For the execution of this calculation, a ring buffer memory (RBM) and an address pointer are provided in operative association with the microcomputer. The ring buffer memory stores the eight previously detected pulse periods D. The address pointer sequentially points to the start address of the memory area of the ring buffer memory storing the eight words of pulse period data (in the 0th memory area to 7th memory area), each time the ENC pulse is detected. After the 7th memory area, the 0th memory area is pointed.

In FIG. 7, "SUM" represents a sum of the eight words of data stored in the ring buffer memory, and "RBM(P)" represents the oldest word of data stored in the memory area within the ring buffer memory indicated by the address pointer. When the ENC pulse is detected, the oldest data is subtracted from the value "SUM", and the latest measured pulse period D is added to the subtracted result. The latest measured pulse period D is overwritten in the memory area indicated by the address pointer, i.e., in the memory area for storing the oldest data. The value "SUM" is divided by the number of data words 8 to obtain the predicted pulse period PRE.D.

The predicted pulse period PRE.D as obtained is multiplied by 0.9, for the same reasons described above with respect to the first embodiment, to obtain the final predicted pulse period. This multiplication by 0.9 may be omitted if the change in the film advance speed is small enough to be neglected. Thereafter, the address pointer is incremented to change the position of the memory area to be pointed, to the area where the oldest data word was stored in the ring buffer memory. If the address increment is performed when the address pointer indicates the highest start address "7" the value of the address pointer automatically resumes the lowest start address 0. This embodiment utilizes eight data words at a minimum when starting the calculation. However, the calculation of the predicted pulse period starts, after 32 ENC pulses are detected after the advance start period, and thus this does not present a problem.

In the embodiments described above, the data recording is adapted to start after the number of ENC pulses generated after the exposure completion reaches a predetermined number. Accordingly, the data recording can be effected substantially, at the same position within a length of a frame. However, it is actually not necessary to maintain a position within a frame length for effecting all of the data recording within the frame length, because the initial several bits of the recorded data are used as start bits, which are easily detected.

Even if a predetermined number of ENC pulses are detected indicating the end of the initial advance period, the film advance speed may not always be stable. In consideration of such a situation, a fourth embodiment, which will be described below, is provided which has an additional process of statistically monitoring the film advance speed.

Figure 8:
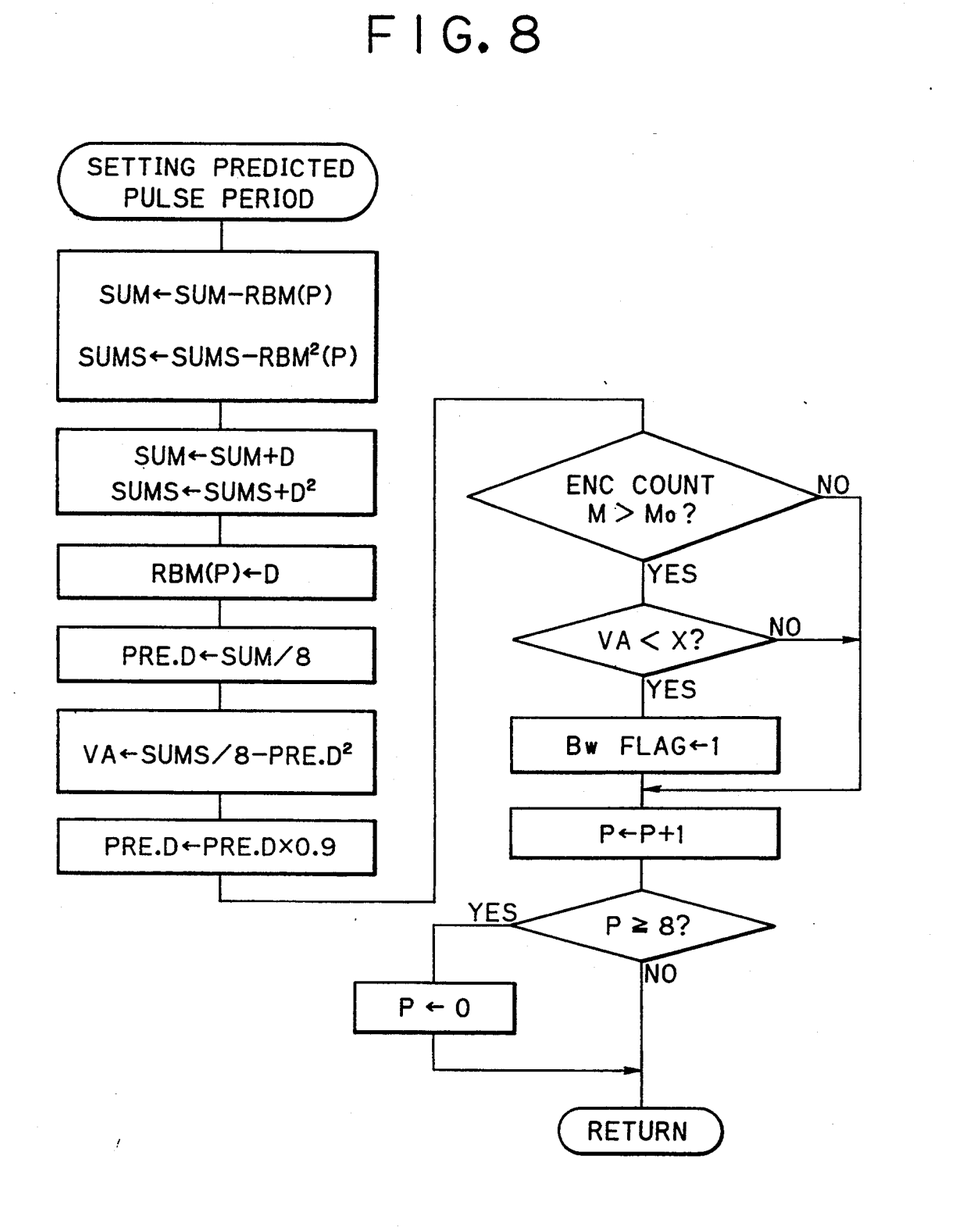
FIG. 8 is a flow chart illustrating an example of the process of obtaining a predicted pulse period according to a fourth embodiment.

In the fourth embodiment whose specific process is illustrated in the flow chart of FIG. 8, the predicted pulse period PRE.D is determined after it is judged that the film advance speed has become constant. For such a judgement, the "SUM" of eight previously measured pulse periods D and the square sum "SUMS" of these eight pulse periods are used. Similar to the embodiments described above, an average value of eight pulse periods D measured in the past is obtained as the predict pulse period PRE.D, and the square of it is calculated. A variance VA is calculated from the following expression.

$$VA = (SUMS/8) - PRE.D^2$$

If the variance VA becomes smaller than a predetermined value X it is determined that the film advance speed has become stable. When this judgement is obtained, it is checked whether the number of ENC pulses detected so far is equal to or larger than the initial setting value MO (e.g., 32) and whether the initial advance period with possible unstable rotation of the motor has passed. If these conditions are met, the predicted pulse period PRE.D is multiplied by 0.9 to obtain the final predicted pulse period PRE.D. A Bw flag is a flag which is reset to 0 at the initialization at the start of the flow chart shown in FIG. 5, and set to 1, when PRE.D is determined. Even if B the flag is set to 1, data recording is inhibited if the Bw flag is 0. The succeeding processes are the same as described previously with respect to the other embodiments.

Figure 9:
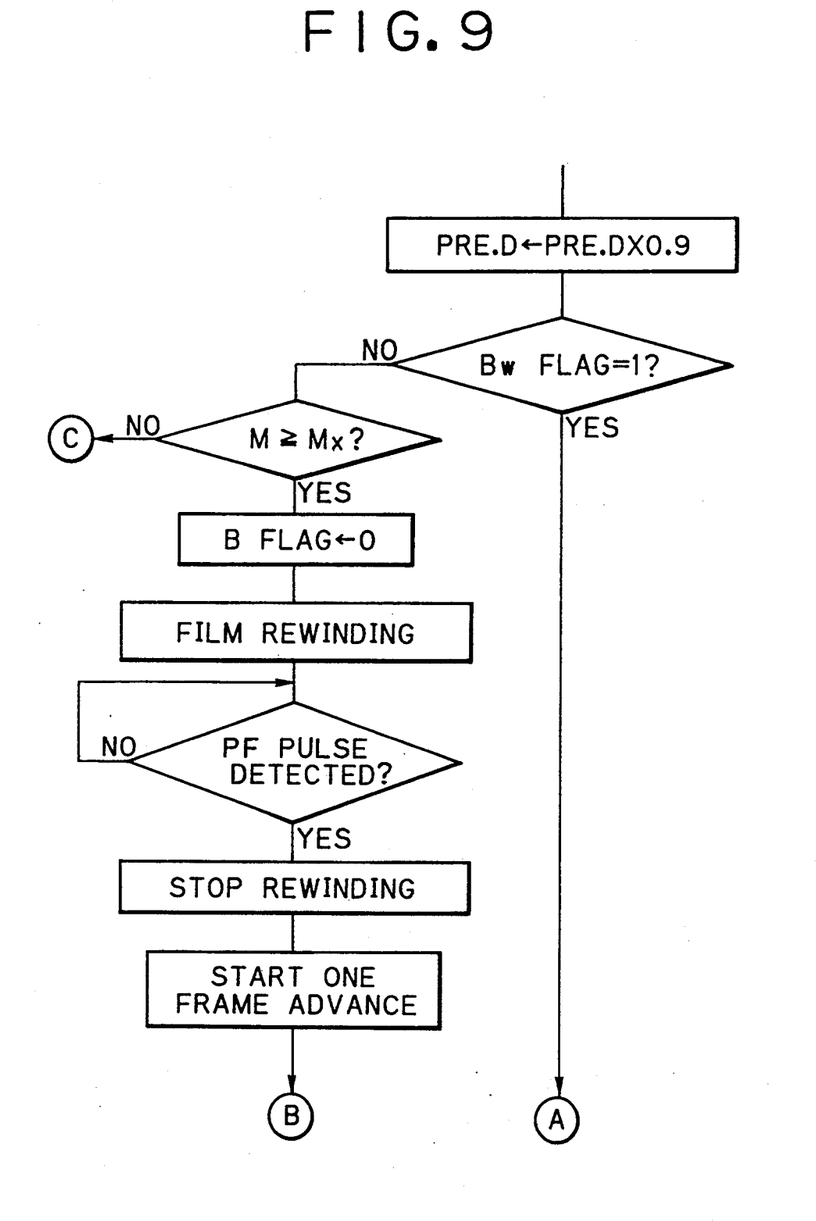
FIG. 9 is a flow chart illustrating the process of advancing a film under a condition wherein the film advance speed is not constant.

In this embodiment, if the film advance speed does not become stable for some reason, the data recording procedure will not begin. If the start timing of the data recording is delayed extremely, data might be incompletely recorded during advancement of one frame. Even if all data can be recorded, it might be recorded on an area outside of the normal data read area. In order to solve this problem, as shown in FIG. 9, if it is judged during the one frame advance with the Bw flag=0 that the film has been advanced to the extent that the ENC count M becomes Mx (e.g., Mx=48) and normal data recording is impossible, then the B flag, which was set to 1 at the initialization of the main routine shown in the flow chart of FIG. 5, is reset to 0 to first inhibit the execution of the data recording.

Then, the microcomputer 5 sends a switching signal to the transmission mechanism 7 to drive the drive shaft 27 in the rewinding direction and rewind the film by one frame into the cassette. When the PF pulse is detected, i.e., when the film has been rewound to assume the state immediately before the start of one frame advance, the rewinding operation is stopped. The microcomputer 5 causes the transmission mechanism 7 to take the film winding direction to once again start the film advance operation for the same frame. Thereafter, the control returns to the processes immediately after the generation of the exposure completion signal as shown in FIG. 5.

If the film advance speed is unstable even after a one frame advance operation progresses to some extent, the calculated predicted pulse period PRE.D is not reliable. In this embodiment, it is possible in such a case, to stop the film advance automatically, rewind the film to the initial position, and once again begin the data recording process. If the processes shown in FIG. 9 are executed a plurality of times and the film advance speed does not become stable, the film is rewound further by an amount in a range of 0.5 to 1 full frame from the initial one frame advance position, and then the film is continuously wound. In this case, when the frame returns to the data recording position, the film advance speed will most probably have a constant speed. In such a manner, all data can be recorded within the length of the frame at the proper recording position. If the film advance speed does not become constant even with this process, the rewinding amount may be increased and a similar operation is carried out.

The present invention has been described in connection with preferred embodiments. The number of ENC pulses to be generated during one frame advance, and the number of data bits to be recorded during the pulse period between two consecutive ENC pulses, among other values, can be set as needed. Means for generating ENC pulses is not limited only to the combinations of encoded disk and photo-interrupter, and film perforations and photo-interrupter. For example, ENC pulses may be generated by reading a magnetically recorded stripe with magnetic areas and non-magnetic areas disposed alternately at a constant pitch on the edge portion of a film, by using a magnetic head. Furthermore, as described previously, a magnetic layer may be formed on one side of a photographic film in the shape of stripe, or on the whole area of the base layer, to record data on this magnetic layer by using a magnetic recording head connected via a driver to the microcomputer 5.

Although the present invention has been described with reference to the preferred embodiments shown in the drawings, the invention should not be limited by the embodiments but, on the contrary, various modifications, changes, combinations and the like of the present invention can be effected without departing from the spirit and scope of the invention as defined by the appended claims.

What is claimed is:

1. A data recording apparatus for a camera, comprising:
    encode pulse generating means for generating an encode pulse each time a film is advanced by a predetermined length;
    measuring means for measuring at least one pulse period based upon previously generated encode pulses;
    calculating means for calculating a predicted pulse period, between a newly generated first encode pulse and a second next subsequent encode pulse to be generated, when said first encode pulse is generated in accordance with said at least one measured pulse period, and calculating a timing of data recording based upon said predicted pulse period; and
    recording means for recording data on said film, during advancement of said film, through a distance corresponding to one frame of said film, within said predicted pulse period in accordance with said timing calculated by said calculating means.

2. A data recording apparatus according to claim 1, further comprising:
    an advancement mechanism engageable with said film; and
    a motor coupled to said advancement mechanism so as to rotate said advancement mechanism after taking a photograph to advance said film through a distance corresponding to one frame of said film.

3. A data recording apparatus according to claim 2, wherein said recording means begins recording data after a predetermined number of encode pulses have been generated by said encode pulse generating means.

4. A data recording apparatus according to claim 2, wherein said calculating means further calculates N timings in accordance with a partial pulse period obtained by dividing said predicted pulse period by N, and said recording means records an N-bit data word on said film within said predicted pulse period in accordance with said N timings wherein N is a real number.

5. A data recording apparatus according to claim 4, further comprising a perforation sensor disposed in a film passage defined in said camera so as to detect perforations formed in said film at a predetermined pitch with one perforation corresponding to each frame, said perforation sensor being coupled to said motor so as to stop said motor when a next one of said perforations is detected.

6. A data recording apparatus according to claim 5, further comprising:
    means for counting said encode pulses; and
    motor controlling means for decelerating said motor when it is judged from the count of said encode pulses that said film has been advanced a distance which is close to a distance corresponding to advancement of one frame.

7. A data recording apparatus according to claim 5, said encode pulse generating means comprising:
    a roller disposed in rotating contact with said film;
    an encoded disk coupled to said roller so as to rotate therewith, said disk having a plurality of slits formed therein;
    a photo detector disposed in opposition to said encoded disk so as to detect each of said slits as said slits pass by said photo detector during rotation of said disk.

8. A data recording apparatus according to claim 7, said recording means comprising:
    a light recording head comprising at least one light emitting diode;
    a mask plate disposed in front of said light emitting diode, said mask plate having an opening formed therein.

9. A data recording apparatus, according to claim 7, said recording means comprising:
    a magnetic recording head.

10. A data recording apparatus according to claim 4, wherein said measured pulse period is a period between said first encode pulse and an encode pulse is generated immediately before said first encode pulse.

11. A data recording apparatus according to claim 4, wherein said calculating means obtains said predicted pulse period by multiplying said measured pulse period by a predetermined constant value.

12. A data recording apparatus according to claim 4, wherein said measuring means measures a plurality of measured pulse periods.

13. A data recording apparatus according to claim 12, wherein said calculating means calculates said predicted pulse period based on an average value of said plurality of measured pulse periods.

14. A data recording apparatus according to claim 12, wherein said calculating means calculates said predicted pulse period by multiplying each of said measured pulse periods by a corresponding weighting coefficient, said weighting factors respectively decreasing in value as the corresponding measured pulse period is older, and adding products of the multiplication.

15. A data recording apparatus according to claim 12, further comprising:
    recording control means coupled to said recording means and said calculating means for allowing the data recording to start only when said measured pulse period corresponds to an allowable range of said predicted pulse period, said allowable range being calculated by said calculating means.

16. A data recording apparatus according to claim 15, further comprising:

control means coupled to said motor for controlling said motor so that when said film is advanced a predetermined amount from an initial position in a state where said recording control means does not allow the data recording to start, said film is returned to said initial position and advanced once again for data recording.

17. A data recording apparatus for a camera, comprising:

a film advancing device engageable with a film so as to advance the film through a distance corresponding to one frame of said film after each frame of said film is photographically exposed;

encode pulse generating means for generating an encode pulse each time said film is advanced by a predetermined length;

measuring means for measuring a pulse period between a new encode pulse and a previously generated encode pulse when said new encode pulse is generated;

calculating means for calculating timing of data recording by predicting the time of generation of a next encode pulse, in accordance with said pulse period measured by said measuring means; and recording means for recording data on said film before said next encode pulse is generated during advancement of said film, in accordance with said timing of data calculated by said calculating means.

18. A data recording apparatus according to claim 16, wherein said calculating means determines said timing of data recording based upon a division pulse period obtained by dividing said pulse period measured by said measuring means by said N, wherein N is a real number.

19. A data recording apparatus for a camera, comprising:

a film advancing device engageable with a film so as to advance the film through a distance corresponding to one frame after each frame of said film is photographically exposed;

encode pulse generating means for generating a plurality of encode pulses, during each advancement of said film through said distance, synchronously with advancement of said film;

measuring means for measuring each pulse period between successive pairs of said plurality of encode pulses;

calculating means for calculating a pulse period between a previously generated encode pulse and a next encode pulse to be generated, based upon said pulse periods measured by said measuring means;

recording control means for providing a write instruction when said pulse period between said previously generated encode pulse and said newly generated encode pulse is within a predetermined range; and recording means for recording data on said film in response to said write instruction.

20. A data recording apparatus according to claim 19, further comprising:

transporting control means for returning said film to an advance start position and again starting advancement of said film, if said pulse period does not enter said predetermined range even after a predetermined number of encode pulses are generated.

* * * * *